Patented Sept. 28, 1943

2,330,253

UNITED STATES PATENT OFFICE 2,330,253

BELTING

William Whitehead, Rye, N. Y., assignor to Celanese Corporation of America, a corporation of Delaware No Drawing. Application February 7, 1941, Serial No. 377,853

4 Claims. (Cl. 117—121)

This invention relates to belting, bands, and tapes employed for transmitting power or rotary motion in machines, or as belt conveyors for moving or handling materials, and relates more particularly to the treatment of belting, bands and tapes to render the same substantially fire-proof and to give them other desirable properties.

Heretofore, belting, bands and tapes, hereinafter all referred to as "belting" for the sake of brevity, used as power transmission and conveyor belts have been produced from leather, webs of woven textile materials, such as cotton, canvas and duck, and even cords. The belting heretofore used was made of a single thickness of material or of laminated or bonded plies thereof. Textile material belting was frequently impregnated with natural or synthetic rubber or resins and like materials in order to increase their solidity and resistance to wear. In the production of leather belting, adhesives such as casein, blood glues, etc. have been employed. Impregnation materials have also been applied to or incorporated in belting to increase the coefficient of friction between the belting and the driven or driving mechanism, thus reducing slip, and loss of power. A factor which lowered the efficiency of belting heretofore used was the ease, relatively speaking, with which they were caused to burn, for example, by heat generated by friction and by hot materials carried on conveyor belts.

It is an object of this invention to provide beltings from textile materials such as woven cotton yarn or laminated cotton fabrics which show increased resistance to wear, improved fire resistance and improved gripping properties on pulleys and other driving or driven mechanisms.

Another object of this invention is to provide beltings of cotton textile materials of improved properties by incorporating therein a material plasticized with a halogenated alkyl phosphate.

A further object of this invention is to provide improved beltings having a base of cotton yarns by incorporating therein an organic derivative of cellulose plasticized with a halogenated alkyl phosphate.

Other objects of this invention will appear from the following detailed description.

I have found that belting having a basis of cotton yarns, i. e. in the form of canvas, duck, laminated fabrics or cords, with or without a coating of natural or synthetic rubber thereon, may be made substantially fire-proof, given increased resistance over pulley surfaces and also given increased resistance to wear by incorporating therein an organic derivative of cellulose, a natural or synthetic resin or any other material plasticizable by a halogenated alkyl phosphate.

In accordance with one aspect of my invention, the belting may be prepared by impregnating the cotton belting material in any suitable manner, as by squeeze rolls, with a solution of the impregnant and the halogenated alkyl phosphate as plasticizer in a volatile solvent therefor. Or, the impregnant and plasticizer may be incorporated in the belting material by passing the latter through rollers adapted to apply thereon a heated plastic mass comprising the impregnant and plasticizer. In another aspect of my invention the belting may be prepared by weaving the same from threads or yarns of cotton and threads or yarns made of or containing an organic derivative of cellulose, resin or rubber, the latter threads or yarns being present in the belting material in the desired amount and in the desired alternation. The threads or yarns comprising the organic derivative of cellulose, resin and rubber may contain the plasticizer prior to the weaving operation, or the plasticizer may be incorporated therein after they are woven into the belting material.

As stated above the impregnant may be a plasticized organic derivative of cellulose, a resin or rubber. Any suitable organic derivative of cellulose such as the cellulose esters and cellulose ethers may be employed. Examples of cellulose esters are cellulose acetate, cellulose propionate and cellulose butyrate while examples of cellulose ethers are ethyl cellulose and benzyl cellulose. Mixed esters such as cellulose aceto-propionate and cellulose aceto-butyrate may also be used. In the same manner any natural or synthetic resin which is capable of being plasticized by the halogenated alkyl phosphate may be used as the impregnant in accordance with my invention. For example, natural resins such as colophony, copal, kauri, dammar, mastic, sandarac and like resins, and synthetic resins such as ureaaldehyde, phenol-aldehyde, glyptal, vinyl, thiourea, aldehyde-amide, furfural and like resins may be used in my invention. I have found that satisfactory results may be obtained by incorporating from 5 to 100% or more of the impregnant in the belting material. I prefer, however, to employ 20%, based on the weight of the belting base material, of the impregnant.

The plasticizer employed may be any halogenated alkyl phosphate. I prefer, however, to employ in the process of my invention trichlorethyl phosphate, the optimum results being obtained by the use of β-trichlorethyl phosphate.

The amount of plasticizer employed depends upon the nature of the material being plasticized and also upon the characteristics desired in the finished product. I have obtained satisfactory results by employing from 5 to 8% of plasticizer based on the weight of impregnant present in the belting material. For example, where a high degree of flexing is desired in the belting material a greater proportion of plasticizer should be used. Where fire-proofing of the material is desired even an amount as low as 5% of plasticizer is efficacious. Where 5% of plasticizer is employed to increase the fire resistance of the belting material the burning stops when the flame is removed therefrom, the material being made more fire-proof by increasing the amount of plasticizer therein.

Any volatile solvent for the impregnant and the plasticizer may be employed where the impregnant and plasticizer are applied to the belting in the form of a solution. Thus, where cellulose acetate is used as the impregnant, acetone or a mixture of acetone and water, or dichlorethylene, methyl or ethyl alcohol, etc. may be used as the solvent.

The belting may be made in any suitable manner. Thus, it may be composed of a single thickness of the cotton fabric, synthetic rubber, etc., or it may be made up of a number of laminae which have been cut straight or on the bias in which case the laminae are treated prior to lamination. The laminae may be caused to adhere to each other by the use of a plasticized cellulose derivative. While the invention has been described in connection with belting made of cotton yarns, I have found that satisfactory results may be obtained by treating, in accordance with this invention, belting made of yarns of synthetic filaments or fibers such as, for example, filaments or fibers of synthetic resins and cellulose derivatives.

The following examples are given by way of illustration and are not to be considered in any way limitative.

*Example I*

A heavy belting duck produced from cotton yarns and weighing 22 ounces per square yard is obtained in 36 inch width. An impregnating mass consisting of 25 parts by weight of acetone-soluble cellulose acetate, 15 parts by weight of β-trichlorethyl phosphate and 75 parts by weight of acetone are mixed together. The duck is impregnated with this mixture by feeding it through the mixture at a speed of 10 yards per minute and a track length of 10 feet. The duck is caused to travel vertically out of the mixture, then through squeeze rolls operating at a mechanical pressure of 10 pounds per linear inch of contact. This operation is repeated, so that in the process, the duck receives two immersions and two squeezes to remove surplus material, expel entrapped air, and produce thorough impregnation. The treated fabric then is passed through a chamber about 20 feet long, either vertical or horizontal, at the speed of 10 yards per minute. The atmosphere in the chamber is heated to about 60° C., this heated atmosphere being circulated through the chamber and exhausted. The fabric so produced can be used, with or without seasoning, as a power driving means or as a means of conveying materials in process.

*Example II*

Fabric processed according to the procedure of Example I, is cut to desired width on the straight or on the bias and is assembled to produce a belting of greater thickness. Bonding together of the laminae is effected by subjecting them to the action of heat and pressure, such as, for example, 100 pounds per square inch at a temperature of 260° C., employing plasticized cellulose acetate as the adhesive.

Instead of bonding the laminae together by the use of an adhesive, the laminae may be stitched together to form the belting.

Belting impregnated with plasticized cellulose acetate in accordance with this invention is highly satisfactory since the belt in use develops heat, which heat makes the cellulose acetate more plastic thus increasing the grip on the pulley surfaces.

In the following claims the impregnant employed is one which is plasticizable by a halogenated alkyl phosphate.

It is to be understood that the foregoing detailed description is given merely by way of illustration and that may variations may be made therein without departing from the spirit of my invention.

Having described my invention, what I desire to secure by Letters Patent is:

1. Belting of improved properties for use as power transmission and conveyor belts, comprising cotton belting material having incorporated therein an organic derivative of cellulose plasticized with a halogenated alkyl phosphate.

2. Belting of improved properties for use as power transmission and conveyor belts, comprising cotton belting material having incorporated therein cellulose acetate plasticizied with β-trichlorethyl phosphate.

3. Belting of improved properties for use as power transmission and conveyor belts, comprising cotton belting material having incorporated therein an organic derivative of cellulose plasticized with a halogenated alkyl phosphate, the halogenated alkyl phosphate being present in an amount equal to from 5 to 85%, based on the weight of the organic derivative of cellulose present.

4. Belting of improved properties for use as power transmission and conveyor belts, comprising cotton belting material having incorporated therein cellulose acetate plasticized with β-trichlorethyl phosphate, the β-trichlorethyl phosphate being present in an amount equal to from 5 to 85%, based on the weight of the cellulose acetate present.

WILLIAM WHITEHEAD.